US006644025B1

(12) United States Patent
Oberhäusser et al.

(10) Patent No.: US 6,644,025 B1
(45) Date of Patent: Nov. 11, 2003

(54) CONTROL ARRANGEMENT FOR AT LEAST TWO HYDRAULIC CONSUMERS AND PRESSURE DIFFERENTIAL VALVE FOR SAID CONTROL ARRANGEMENT

(75) Inventors: Martin Oberhäusser, Aschaffenburg (DE); Thomas Weickert, Karsbach-Hessdorf (DE)

(73) Assignee: Bosch Rexroth AG, Lohr/Main (DE)

( * ) Notice: Subject to any disclaimer, the term of this patent is extended or adjusted under 35 U.S.C. 154(b) by 0 days.

(21) Appl. No.: 09/890,533

(22) PCT Filed: Jan. 15, 2000

(86) PCT No.: PCT/EP00/00294

§ 371 (c)(1),
(2), (4) Date: Jul. 27, 2001

(87) PCT Pub. No.: WO00/46513

PCT Pub. Date: Aug. 10, 2000

(30) Foreign Application Priority Data

Feb. 5, 1999 (DE) ........................................ 199 04 616

(51) Int. Cl.$^7$ ................................................ F16D 31/02

(52) U.S. Cl. ........................................... 60/422; 60/446

(58) Field of Search .......................... 60/446, 447, 516, 60/422, 426

(56) References Cited

U.S. PATENT DOCUMENTS

| | | | |
|---|---|---|---|
| 4,864,822 A | 9/1989 | Wachs et al. | |
| 4,870,819 A | 10/1989 | Walzer | |
| 5,182,909 A | 2/1993 | Stellwagen | |
| 5,271,227 A | 12/1993 | Akiyama | |
| 5,271,428 A | 12/1993 | Dunn | |
| 5,460,001 A | * 10/1995 | Kato et al. | 60/426 |
| 5,493,861 A | 2/1996 | Friedrichsen | |

FOREIGN PATENT DOCUMENTS

| | | |
|---|---|---|
| DE | 3418261 | 11/1985 |
| DE | 3844400 | 7/1990 |

(List continued on next page.)

*Primary Examiner*—Edward K. Look
*Assistant Examiner*—Michael Leslie
(74) *Attorney, Agent, or Firm*—Martin A. Farber

(57) ABSTRACT

A control arrangement to supply-pressure medium to at least two hydraulic consumers having a variable-displacement pump controlled according to required flow and the setting of which can be changed by a, pump controller as a function of highest load pressure of the actuated hydraulic consumers; two adjustable meter-in variable restrictors, a first of which is arranged between a feed line, which leads from the variable-displacement pump, and a first hydraulic consumer, and the second of which is arranged between the feed line and a second hydraulic consumer; and two pressure compensators, a first of which is connected downstream of the first meter-in variable restrictor and the second of which is connected downstream of the second meter-in variable restrictor, and the control piston of which can be acted on in opening direction by the pressure downstream of the associated meter-in variable restrictor. To ensure in this type control arrangement that a brief excess quantity from the variable-displacement pump is not passed on to the hydraulic consumers, the control pistons of the pressure compensators can be acted on in closing direction by a control pressure which is present in a rear control space, is derived from the feed pressure prevailing in the feed line with aid of a valve device and changes with the feed pressure. There is also a pressure differential valve which, with small structure, allows a pressure at its outlet to follow, with a fixed pressure difference, a rising pressure at its inlet. Together with a restricted pressure relief of the outlet to the tank, this type pressure differential valve ensures in each case a fixed pressure difference between the outlet pressure and the inlet pressure. This valve is particularly suitable for use in the control arrangement.

13 Claims, 3 Drawing Sheets

FOREIGN PATENT DOCUMENTS

| | | |
|---|---|---|
| DE | 4110519 | 10/1992 |
| DE | 29617735 | 11/1997 |
| DE | 19653894 | 6/1998 |
| DE | 19714141 | 10/1998 |
| EP | 0297682 | 1/1989 |
| EP | 0368636 | 5/1990 |
| EP | 69025462 | 11/1990 |
| EP | 0566449 | 10/1993 |

* cited by examiner

~25bar
10
11
12
13
14
15
16
17
18
19
20
21
22
23
24
25
26
30
31
32
33
34
35
36
37
45
46
47
49
50
51
52
55
56
57
58
60

CONTROL ARRANGEMENT FOR AT LEAST TWO HYDRAULIC CONSUMERS AND PRESSURE DIFFERENTIAL VALVE FOR SAID CONTROL ARRANGEMENT

FIELD AND BACKGROUND OF THE INVENTION

The invention relates to a control arrangement which is used to supply at least two hydraulic consumers with pressure medium. The invention also relates to a pressure differential valve which is used in particular in said control arrangement.

A hydraulic control arrangement of this type is known, for example from EP 0 566 449 A1. This document relates to a hydraulic control arrangement using the load-sensing principle, in which a variable-displacement pump is set, as a function of the highest load pressure of the actuated hydraulic consumers, in each case in such a way that the feed pressure is higher than the highest load pressure by a defined pressure difference. The pressure medium flows to the two hydraulic consumers via two adjustable meter-in variable restrictors, a first of which is arranged between a pump line leading from the variable-adjustment pump and a first hydraulic consumer, and the second of which is arranged between the pump line and the second hydraulic consumer. The pressure compensators connected downstream of the meter-in variable restrictors mean that, if a sufficient quantity of pressure medium is supplied, there is a defined pressure difference across the meter-in variable restrictors irrespective of the load pressures of the hydraulic consumers, so that the quantity of pressure medium flowing to one hydraulic consumer is only dependent on the opening cross section of the meter-in variable restrictor in question. If a meter-in variable restrictor is opened further, it is inevitable that a greater quantity of pressure medium will flow through it, in order to generate the defined pressure difference.

The variable-displacement pump is in each case adjusted in such a way that it supplies the quantity of pressure medium which is required. This is therefore known as control based on the required flow.

The pressure compensators which follow the meter-in variable restrictors are acted upon in the opening direction by the pressure downstream of the respective meter-in variable restrictor and in the closing direction by a control pressure which prevails in a rear control space and which usually corresponds to the highest load pressure of all the hydraulic consumers supplied by the same hydraulic pump. If, in the event of simultaneous actuation of a plurality of hydraulic consumers, the meter-in variable restrictors are opened so wide that the quantity of pressure medium supplied by the hydraulic pump, which has been moved all the way to its stop, is lower than the total quantity of pressure medium required, the quantities of pressure medium flowing to the individual hydraulic consumers are reduced in equal proportions irrespective of the prevailing load pressure of the hydraulic consumers. This is therefore referred to as control with load-independent flow distribution (LIFD control). Hydraulic consumers which are controlled in this way are known as LIFD consumers for short. Since, with LIFD control, the highest load pressure is also sensed and a feed pressure which lies above the highest load pressure by a defined pressure difference is generated by the pressure medium source, LIFD control is a special case of a load-sensing control (LS control).

There is no load-independent flow distribution in the case of a plurality of hydraulic consumers to which pressure medium flows in each case via a meter-in variable restrictor with upstream pressure compensator which is acted upon in the closing direction only by the pressure upstream of the meter-in variable restrictor and in the opening direction only by the load pressure of the corresponding hydraulic consumer and by a compression spring. This is a case of a simple LS control and an LS consumer. A control set-up of this type is known, for example, from DE 197 14 141 A1. In the event of simultaneous actuation of a plurality of hydraulic consumers and of insufficient quantities of pressure medium being supplied by the variable-displacement pump, in this case only the quantity of pressure medium flowing to the hydraulic consumer with the highest load pressure is reduced.

An advantage of LS control with pressure compensators connected upstream of the meter-in variable restrictors compared to LS control with pressure compensators connected downstream of the meter-in variable restrictors, however, is that, in the event of an excess quantity being supplied for a brief time by the variable-adjustment pump and an associated rise in the feed pressure, the upstream pressure compensators, by reducing their opening cross section, do not allow any increase in the pressure difference across the meter-in variable restrictors, so that no further pressure medium flows across the meter-in variable restrictors and the speed of the hydraulic consumers is not changed. The excess quantity flows back to a tank via a pressure-limiting valve. In the case of a control set-up with pressure compensators connected downstream of the meter-in variable restrictors, by contrast, the excess quantity is passed through to the hydraulic consumers.

Depending on whether the user attaches more importance to a load-independent flow distribution or to preventing excess quantities from flowing to the hydraulic consumers, he will select an LIFD control or an LS control. This has hitherto been a drawback for the manufacturers of hydraulic components, since they have to offer control blocks for both LIFD control set-ups and for LS control set-ups. These differ considerably, since very divergent structures are required depending on whether a pressure compensator is connected upstream or downstream of the corresponding meter-in variable restrictor.

SUMMARY OF THE INVENTION

By contrast, the invention is based on the objective of providing a hydraulic control arrangement which has the features of the introductory-mentioned type, i.e. in which in particular pressure compensators are connected downstream of meter-in variable restrictors, in such a way that the flow of excess quantities to the hydraulic consumers is prevented.

The desired object is achieved, according to the invention, in a hydraulic control arrangement of the generic type, wherein the control pistons of the pressure compensators can be acted on in the closing direction by a control pressure which is present in a rear control space, is derived from the feed pressure prevailing in the feed line with the aid of a valve device and changes with the feed pressure. While in the known hydraulic control arrangement with pressure compensators connected downstream of the meter-in variable restrictors these compensators are acted on in the rear control space by the highest load pressure, on which the delivery quantity of the variable-displacement pump has no influence, in a control arrangement according to the invention the control pressure which is present in the rear control space is derived from the feed pressure and changes with the latter. Therefore, if the feed pressure rises on account of a delivery quantity from the variable-displacement pump rising beyond demand, the control pressure also rises. The control pistons of the pressure compensators are moved accordingly in the closing direction, so that the pressure downstream of the meter-in variable restrictors also rises and the pressure difference across the meter-in variable restrictors does not change. However, a constant pressure difference across a meter-in variable restrictor also means a constant quantity of pressure medium flowing across the meter-in variable restrictor. Therefore, while maintaining the basic arrangement of meter-in variable restrictor and downstream pressure compensator, and therefore without fundamental changes to a control block, the same control performance as in the case of a control set-up with pressure compensators connected upstream of the meter-in variable restrictors, i.e. control blocks of altogether different construction, is achieved with minor modifications.

Therefore, the difference between the feed pressure and the control pressure, when the variable-displacement pump has not been displaced as far as its stop, i.e. when there is a sufficient quantity of pressure medium, is preferably no greater than between the feed pressure and the highest load pressure. This is because if the pressure difference were greater, the quantity of pressure medium flowing to one hydraulic consumer would depend on whether the load pressure of this hydraulic consumer is higher or lower than the control pressure. The control pressure is preferably slightly higher than the highest load pressure, so that on the one hand there are no unnecessary throttling losses at the pressure compensators, but on the other hand in each case the pressure compensator assigned to the hydraulic consumer with the highest load pressure is still within the control range.

In principle, it is conceivable for the pressure difference between the feed line and a rear control space at a pressure compensator to be produced by connecting a nozzle between the feed line and the control space and by connecting a flow-regulating valve between the control space and a tank. In each case a defined quantity of control fluid would flow out of the control space to the tank via the flow-regulating valve. This quantity of control fluid would flow to the control space via the nozzle. Therefore, there would be a constant pressure gradient across the nozzle. However, the quantity of pressure medium flowing via a nozzle is highly dependent on the viscosity of the pressure medium. It therefore appears more appropriate to use a pressure differential valve, an inlet of which is connected to the feed line and an outlet of which is connected to the rear control space of a pressure compensator, instead of a nozzle. According to a feature of the invention, the pressure differential valve is preferably set to a fixed pressure difference and has a movable valve member which is acted on by the feed pressure for the purpose of opening fluid communication between the feed line and the control space at the pressure compensator and is acted on by the control pressure and by a spring for the purpose of closing this communication.

The invention provides a particularly preferred configuration, according to which the rear control spaces of a plurality of pressure compensators are directly connected to one another, so that the same control pressure prevails in these control spaces. Therefore, only one valve device for deriving the control pressure from the feed pressure is required for these pressure compensators. In a particularly advantageous configuration, the control arrangement has a load signaling line, to which the highest load pressure of the hydraulic consumers actuated in each case is input via selection valves, and a valve which opens up fluid communication from the load signaling line to the rear control space of at least one pressure compensator when the difference between the feed pressure and the highest load pressure falls below a defined level. In this way, in the case of undersaturation, i.e. in the event of insufficient pressure medium being delivered by the variable-displacement pump, the result is a load-independent flow distribution between the hydraulic consumers, the control space of the pressure compensators of which is connected to the load signaling line.

If the supply of pressure medium to one hydraulic consumer is to be prioritized over the supply to another hydraulic consumer in the event of undersaturation, this is advantageously achieved by a configuration, wherein the rear control space at the pressure compensator of the hydraulic consumer which is to be supplied with pressure medium as a priority is then separate from the control spaces at the pressure compensators of the other hydraulic consumers. The control pressure in this priority consumer is derived from the feed pressure via a further valve device. Moreover, there is a priority valve, by means of which, in order to maintain a desired pressure difference across the meter-in variable restrictor arranged upstream of the pressure compensator of the prioritized hydraulic consumer, and therefore to maintain a sufficient supply of pressure medium to the prioritized hydraulic consumer, in the event of a quantity of medium delivered by the variable-displacement pump not meeting demand, the control pressure in the rear control space of the other hydraulic consumers is raised to above the control pressure in the case of saturation. The priority valve preferably has a first port, which is connected to the feed line, and a second port, which is connected to the rear control spaces of the pressure compensators assigned to the hydraulic consumers which are not prioritized, and has a valve member, which, in the direction of opening the connection between the first port and the second port, can be acted on by the pressure prevailing in a line section downstream of the meter-in variable restrictor assigned to the prioritized hydraulic consumer and by an additional force, and, in the direction of closing the connection between the first port and the second port, can be acted on by the feed pressure. Downstream of the meter-in variable restrictor, a control space of the priority valve may be connected to the line section upstream or downstream of the pressure compensator, since the priority valve comes into action when the pressure compensator is completely open and because the same pressure, namely the load pressure of the prioritized hydraulic consumer, then prevails upstream and downstream of the pressure compensator.

A further object of the invention is to provide a pressure differential valve which is used in particular to derive a control pressure for a pressure compensator from the feed pressure in a control arrangement, which is of particularly small structure, so that it can readily be inserted into a control block.

A pressure differential valve of this type is obtained by features of the invention.

Advantageous configurations of a pressure differential valve of this type are also provided by the invention.

A further object of the invention is to provide a pressure differential valve which is used in particular to derive a control pressure for a pressure compensator from the feed pressure in a control arrangement in accordance with one of patent claims 1 to 9 and which is of particularly small structure, so that it can readily be inserted into a control block.

A pressure differential valve of this type is obtained by means of the features given in the defining part of patent claim 10.

Advantageous configurations of a pressure differential valve of this type are given in patent claims 11 to 13.

BRIEF DESCRIPTION OF THE DRAWINGS

In each case one exemplary embodiment of a control arrangement according to the invention and of a pressure differential valve used therein are illustrated in the drawings. The invention will now be explained in more detail with reference to the figures shown in the drawings, in which.

DETAILED DESCRIPTION OF THE PREFERRED EMBODIMENT

Figures 1, 1A:
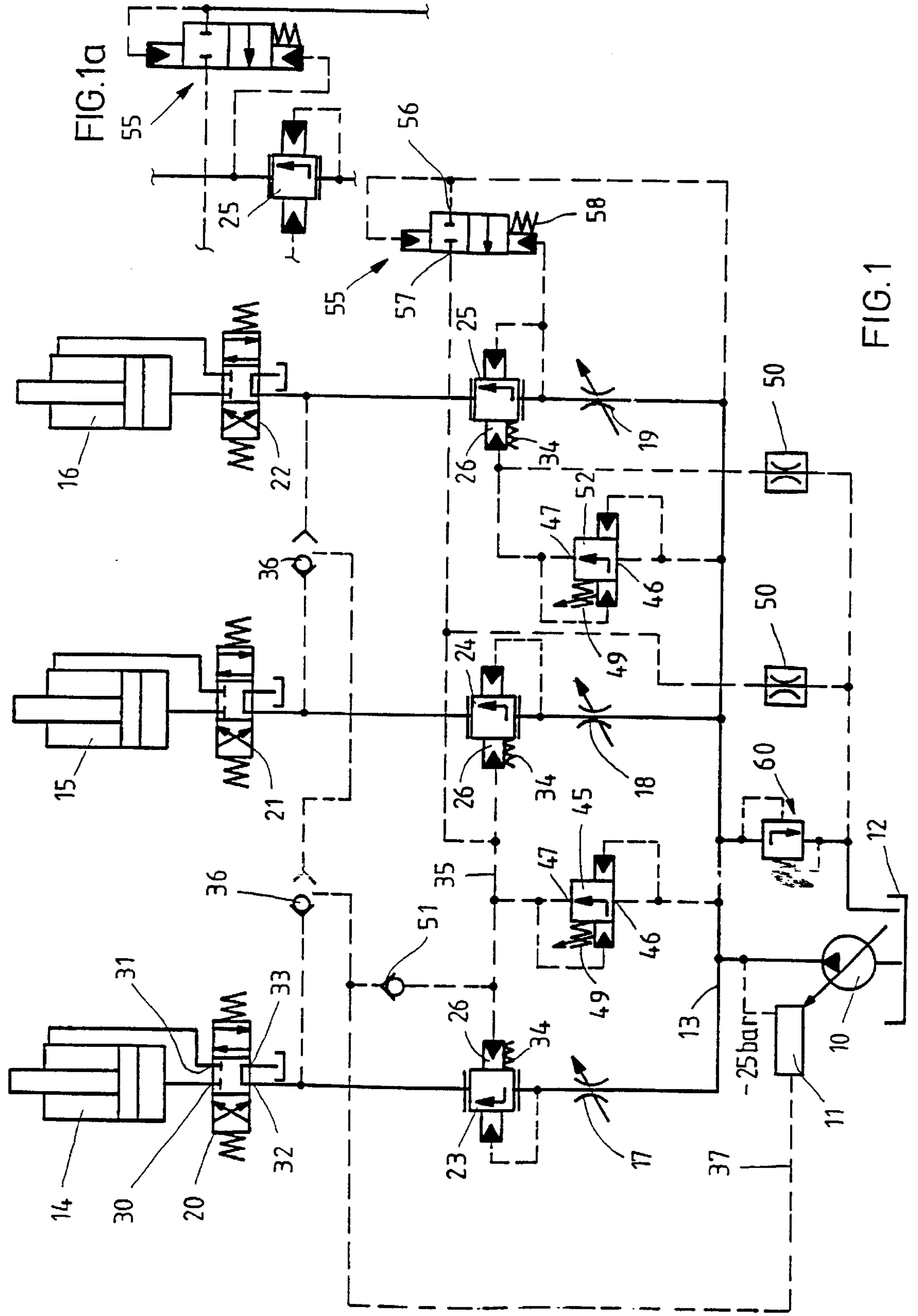
FIG. 1 shows a circuit diagram of the exemplary embodiment of the control arrangement which in the event of undersaturation has an LIFD performance and which preferably includes a prioritized hydraulic consumer.
FIG. 1*a* shows an alternative for activation of the priority valve shown in FIG. 1.

In accordance with FIG. 1, a variable-adjustment pump 10 with a variable-displacement means 11 sucks pressure medium out of a tank and discharges it into a system of feed lines 13. In this exemplary embodiment, three hydraulic consumers 14, 15 and 16, which are all constructed as differential cylinders, are supplied with pressure medium via the feed lines. To control the speed and direction of movement, each differential cylinder 14, 15 and 16 is assigned a meter-in variable restrictor 17, 18 and 19, respectively, and a 4/3-way valve 20, 21 and 22, respectively. In practice, a meter-in variable restrictor and a directional control valve are in each case integrated in one another in such a manner that, through the actuation of a valve slide which is spring-centered in a center position, in a specific direction out of the center position, the direction of movement of the differential cylinder is preset, and the opening cross section of the meter-in variable restrictor is determined by the displacement executed during the movement of the valve slide. For a specific design solution, reference is made at this point to EP 0 566 449 A1, which has already been mentioned above. The meter-in variable restrictors 17, 18 and 19 are connected to the system of feed lines 13. Between a meter-in variable restrictor 17, 18 and 19 and a directional control valve 20, 21 and 22, respectively, there is in each case a pressure compensator 23, 24 and 25, respectively, of which the control piston (not shown in more detail) is acted on in the opening-direction by the pressure downstream of the respective meter-in variable restrictor, and in the closing direction is acted on by a control pressure prevailing in a rear control space 26. The directional control valves 20, 21 and 22 each have two consumer ports 30, 31 which are connected to pressure spaces of the corresponding differential cylinder, a feed port 32, which is connected to the outlet of the respective pressure compensator, and a return port 33, from which a return line leads to the tank 12. In the center position of a directional control valve, the two consumer ports are blocked and the feed port is connected to the tank port. Therefore, the line section between the outlet of the pressure compensator and the feed port is freed of pressure load. In a lateral working position of a directional control valve, pressure medium flows to one pressure space of a hydraulic cylinder, while pressure medium can flow out of the other pressure space to the tank.

In the closing direction, the control pistons of the pressure compensators 23, 24 and 25 are acted on not only by a control pressure but also by a weak compression spring 34, which is equivalent to a pressure of, for example, only 0.5 bar. Moreover, the control spaces 28 and 27 of the two pressure compensators 23 and 24 are connected to one another via a passage 35, so that the same control pressure is always present in both control spaces 26 and 27.

Figure 2:
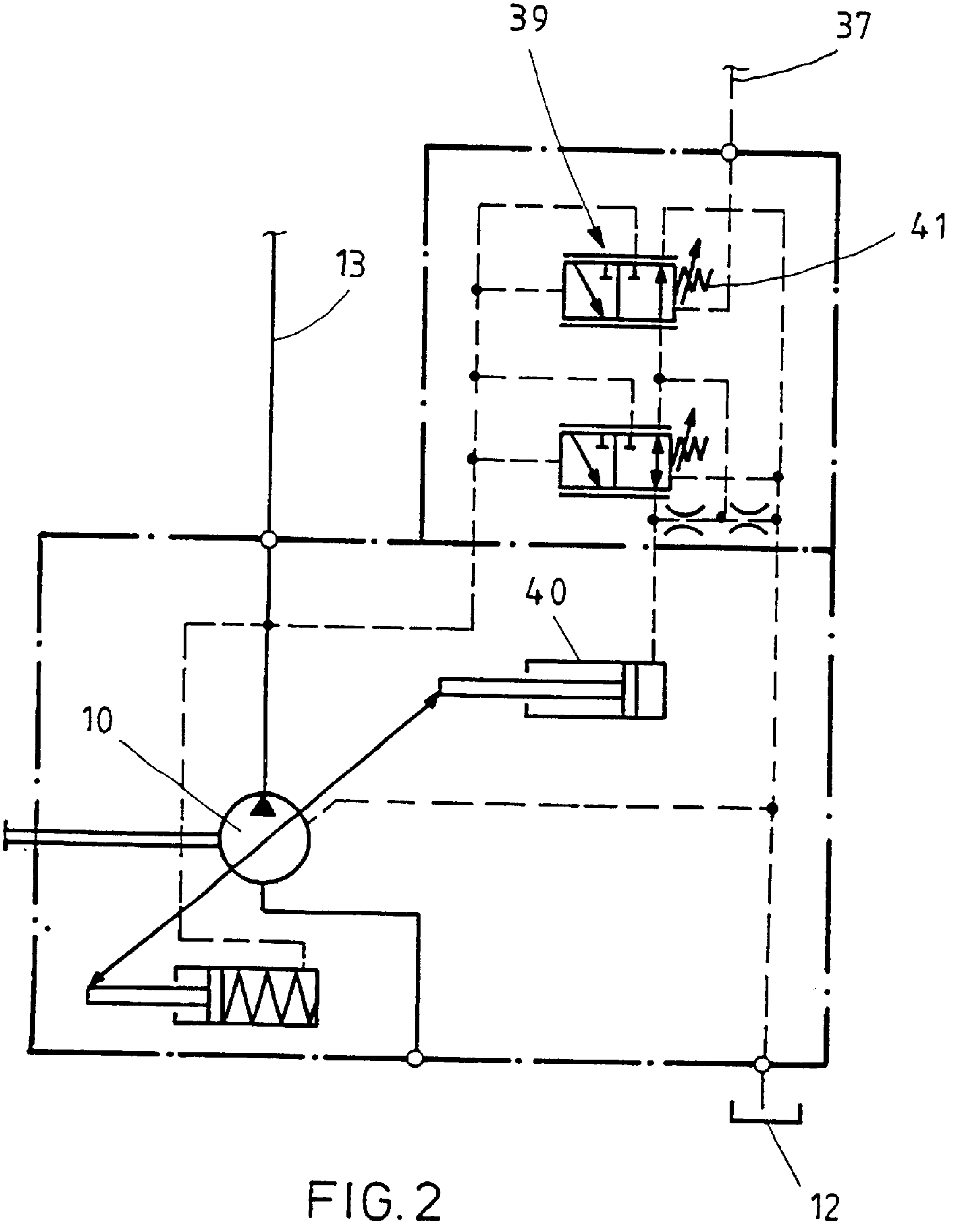
FIG. 2 shows the circuit diagram of a variable-displacement pump used in the exemplary embodiment.

Shuttle valves 36, which are linked to one another in such a manner that in a load signaling line 37, which leads to the variable-displacement means 11 of the pump 10, in each case the highest load pressure of all actuated differential cylinders is present, are connected to the outlets of the pressure compensators 23, 24 and 25 and to the feed ports 32 of the directional control valves. The result of this, as can be seen in particular from FIG. 2, is that the load signaling line 37 is connected to a control valve 39 by means of three ports, one of which is connected to an adjustment cylinder 40 of the variable-displacement pump 10. A further port of the control valve 39 is connected to a supply line 13, and the third port is connected to tank 12. In the direction of a connection between the first port and the second port, the control piston of the control valve 39 is acted on by the pressure in the supply line 13, and in the direction of a connection between the first port and the third port, the control piston of the control valve 39 is acted on by the pressure in the load signaling line 37 and by a control spring 41. Variable-displacement pumps and control valves as shown in the circuit diagram of FIG. 2 are generally known and are commercially available without problems. It is therefore unnecessary to provide any further details of these components. It should merely be pointed out that the load-sensing pump control shown has the effect of establishing a pressure in the supply line 13 which is higher than the pressure in the load signaling line 37 by a pressure difference which is equivalent to the force of the control spring 41.

A pressure differential valve 45 is arranged between the system of feed lines 13 and the passage 35 between the two control spaces 26 of the pressure compensators 23 and 24. An inlet opening 46 of this valve is connected to the feed lines 13, and an outlet opening 47 is connected to the passage 35. Depending on the position of a piston slide 48, which cannot be seen in FIG. 1 but is visible in FIG. 3, of the pressure differential valve 45, the inlet opening 46 and the outlet opening 47 are blocked with respect to one another or are in fluid communication with one another via a more or less large opening cross section. In the direction of reducing the opening cross section between the inlet opening and the outlet opening, the piston slide 48 is acted on by the pressure prevailing in the passage 35 and in the control spaces 26 of the pressure compensators and by a compression spring 49, and in the direction of increasing the opening cross section is acted upon by the feed pressure prevailing in the supply lines 13. The active surfaces on the piston slide for the control pressure and the feed pressure to engage on are of equal size, so that the pressure differential valve 45 ensures that the control pressure which is present in the passage 35 follows a rising feed pressure in each case with an interval of a differential pressure which is equivalent to the force of the compression spring 49. By way of example, the pressure differential valve 45 is set in such a way that the control pressure is 20 bar lower than the feed pressure. The passage 35 is connected to tank 12 via a low-flow regulator 50, so that the control pressure in the passage 35 is also able to follow a decreasing feed pressure as a result of pressure medium flowing out via the low-flow regulator so.

Between the load signaling line 37 and the passage 35 there is a nonreturn valve 51, which opens from the load signaling line 37 toward the passage 35 when the pressure in the passage 35 becomes equal to the pressure in the load signaling line 37. The control pressure which is present in the control spaces 26 of the pressure compensators 23 and 24 therefore cannot drop below the highest load pressure which is present in the load signaling line 37.

There is a second pressure differential valve 52, which is constructed identically to the pressure differential valve 45 and the inlet opening 46 of which is likewise connected to a supply line 13. The outlet opening 47 of the pressure differential valve 52 is connected to the control space 26 of the pressure compensator 25. The piston slide of the pressure differential valve 52 is controlled in exactly the same way as the piston slide of the pressure differential valve 45. Both valves are set to the same pressure difference of, for example, 20 bar. If a sufficient quantity of medium is delivered by the variable-displacement pump 10, therefore, the control pressure in the control spacers 26 is 20 bar lower than the feed pressure and, since, by way of example, the latter is supposed to be 25 bar higher than the highest load pressure, the control pressure is 5 bar higher than the highest load pressure. Therefore, all the pressure compensators 23, 24 and 25, including the one which is assigned to the consumer with-the highest load pressure, are in the control position. Furthermore, the control space 26 of the pressure compensator 25 is connected to tank 12 via a second low-flow regulator 50.

If the variable-displacement pump 10 is providing its maximum delivered quantity and this quantity does not meet demand, the differential cylinder 16 is to be supplied with pressure medium on a priority basis ahead of the other two hydraulic cylinders 14 and 15. For this purpose, there is a priority valve 55, which is constructed as a proportional variable restrictor with an inlet 56 and an outlet 57. The latter is in fluid communication with the passage 35. The inlet 56 is connected to a supply line 13 upstream of the meter-in variable restrictor 19. The movable valve member, which is not shown in more detail, of the priority valve, in the direction of closing the connection between the inlet and the outlet, is acted on by the pressure in the inlet, i.e. by the feed pressure, and, in the direction of opening the connection, is acted on by the pressure downstream of the meter-in variable restrictor 19 and by the force of a control spring 58. The control spring 58 is constructed, for example, in such a way that there is an equilibrium of forces at the valve member of the priority valve if the pressure difference between the feed pressure and the pressure downstream of the meter-in variable restrictor 19 is 19 bar. This value is slightly lower than the value of the pressure difference across the pressure differential valve 52 minus a pressure value of 0.5 bar which is equivalent to the force of the compression spring 34. Therefore, while in normal operation there is a pressure difference of 19.5 bar across the meter-in variable restrictor 19, the priority valve 55 does not respond. If, as a result of a reduction in the feed pressure, the pressure difference across the meter-in variable restrictor 19 drops to below 19.5 bar, the pressure compensator 25 opens completely, so that the pressure downstream of the meter-in variable restrictor 19 is equal to the load pressure of the prioritized hydraulic consumer 16. On the spring side, the load pressure of the consumer is now present at the priority valve 55. This pressure is able to open the priority valve 55 against the feed pressure, with the result that the pressure in the passage 35 and therefore in the control spaces 26 of the pressure compensator 23 and 24 is raised to above the highest load pressure. Therefore, the pressure compensators 23 and 24 are adjusted in the closing direction until, as a result of a rise in the pressure downstream of the meter-in variable restrictors 17 and 18, an equilibrium of forces is once again reached at the control pistons. Now, however, the pressure difference across the meter-in variable restrictors 17 and 18 has been reduced. The flows of pressure medium flowing to the consumers 14 and 15 have been reduced. Ultimately, by raising the pressure in the control spaces 26 of the pressure compensators 23 and 24, the priority valve 55 ensures that, as a result of a rise in the control pressure in the passage 35 the pressure difference across the meter-in variable restrictors 17 and 18, and therefore the flows of pressure medium flowing to the hydraulic consumers 14 and 15, are in each case reduced to such an extent that a quantity of pressure medium which generates a pressure difference which is approximately equal to the pressure difference in normal operation is flowing across the meter-in variable restrictor 19.

As mentioned above, in the case of undersaturation, i.e. when the priority valve 55 is intended to respond, load pressure prevails downstream of the meter-in variable restrictor 19. Alternatively, therefore, the spring-side control space 55 of the priority valve 55 may be connected not to the connection between the meter-in variable restrictor 19 and the pressure compensator 25, but rather to the outlet of the pressure compensator 25, as shown in FIG. 1*a*. The valve member of the priority valve 55 is then always acted on by the load pressure of the priority hydraulic consumer 16 in the direction of opening the connection between the inlet 56 and the outlet 57. The priority valve can then be set to the same pressure difference which prevails across the meter-in variable restrictor 19 in normal operation, since in normal operation the pressure difference between the load pressure of the priority hydraulic consumer 16 and the feed pressure is higher than the pressure difference across the meter-in variable restrictor 19, and therefore the priority valve 55 definitely does not respond.

If the situation of undersaturation occurs with only one of the hydraulic consumers 14 and 15 actuated, the control pressure in the passage 35 becomes equal to the highest load pressure, prevailing in the load signaling line 37, of the two hydraulic consumers 14 and 15 as a result of the feed pressure being lowered. Therefore, the highest load pressure is also signaled to the passage 35 via the nonreturn valve 51. Consequently, a further drop in the feed pressure no longer leads to a further fall in the control pressure in the passage 35 and in the control spaces 26 of the pressure compensators 23 and 24. These ensure that, irrespective of the level of the feed pressure, a pressure which is higher than the highest load pressure by the pressure equivalent of the springs 34 prevails between them and the meter-in variable restrictors 17 and 18. This pressure, which is slightly above the highest load pressure, is present downstream of both meter-in variable restrictors 17 and 18. Feed pressure prevails upstream of both meter-in variable restrictors 17 and 18. Therefore, the pressure difference across the meter-in variable restrictor 17 is equal to the pressure difference across the meter-in variable restrictor 18. Therefore, in the event of undersaturation, the flows of pressure medium to the hydraulic consumers 14 and 15 are in relative terms reduced irrespective of whether the prioritized consumer 16 is also actuated. The consumers 14 and 15 are therefore LIDF consumers.

If the demand for pressure medium from all hydraulic consumers which are actuated simultaneously is covered by the variable-displacement pump 10, the pressure differential valves 45 and 52, together with the flow regulators 50, ensure that the control pressures in the control spaces 26 of the pressure compensators follow the feed pressure with a fixed difference. If the variable-adjustment pump 10 then briefly produces a quantity which exceeds demand, for example because a wide-open meter-in variable restrictor is closed altogether, the feed pressure rises strongly for a brief period. The control pressures follow this rise, so that the control pistons of the pressure compensators are acted on by an increased control pressure in the closing direction, move in the closing direction of the pressure compensators and as a result raise the pressure downstream of the meter-in variable restrictors, so that the pressure difference across the meter-in variable restrictors 17, 18 and 19 remains constant or only increases slightly. Consequently, the speed of a hydraulic consumer also does not change. The excess quantity flows away to the tank via a pressure-limiting valve. 60.

Figure 3:
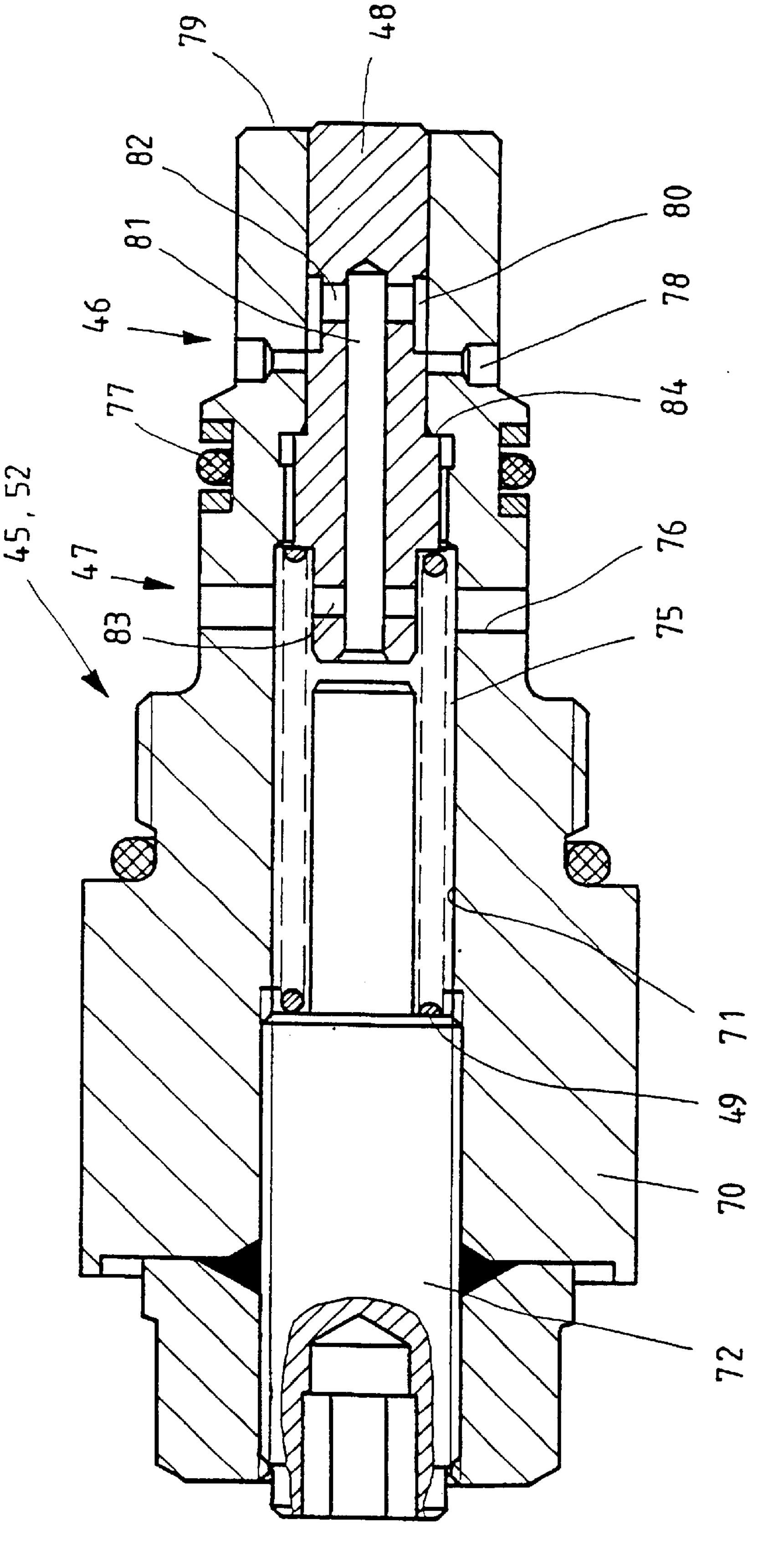
FIG. 3 shows a longitudinal section through the pressure differential valve used in the exemplary embodiment shown in FIG. 1.

As has already been indicated, the pressure differential valves 45 and 52 used in the control arrangement shown in FIG. 1 are identical and, as can be seen from FIG. 3, are constructed as insertion cartridges. They have a cartridge casing 70, through which a stepped valve bore 71 passes in the axial direction. An adjustment screw 72, which is used to close the valve bore 71 and to support the control spring 49, is screwed into the valve bore 71 from one end. This control spring is situated in the section of the valve bore 71 which has the larger diameter, into which the adjustment screw 72 has also been screwed. By means of its end facing away from the adjustment screw 72, the control spring 49 is supported on the piston slide 48, which is guided in an axially movable fashion in the valve bore 71. The free space in the valve bore between the adjustment screw 72 and the piston slide 48 can be referred to as a spring space 75. A star-shaped arrangement of radial bores 76, which form the outlet 47 of the pressure differential valve, opens freely into this spring space. At an axial distance from the radial bores 76 and separated in fluid terms from the radial bores 76 by a sealing arrangement 77 after installation in a block, further radial bores 78, which form the inlet of the pressure differential valve, pass through the cartridge housing 70. Also after installation in a block, there is free fluid communication between the radial bores 78 and the end side 79 of the cartridge housing 70, at which that section of the valve bore 71 which has the smaller diameter passes to the outside, along the cartridge housing 70.

The piston slide 48 is guided axially in the latter section of the valve bore 71, where on the outside it has an annular groove 80, creating an annular space between it and the wall of the valve bore 71. An axial blind bore 81, which extends as far as the region of the annular groove 80, where it is connected to the annular groove 80 via individual radial bores 82, is formed in the piston slide 48 from the end side which faces the adjustment screw 72. Further radial bores 83 provide open fluid communication between the bore 81 and the spring space 75 and therefore the outlet 47 even when an end side of the piston slide 48 is bearing against a stop of the adjustment screw 72. The piston slide 48 has an outer shoulder 84, by means of which it can be pressed against the inner shoulder of the valve bore 71 by the control spring 49. When the piston slide 48 is bearing against the inner shoulder, the annular groove 80 is situated between the star-shaped arrangement of radial bores 78 and the end side of the cartridge housing 70. There is no opening cross section between the radial bores 78 and the annular groove 80. On both sides of the annular groove 80, the piston slide 48 is guided as a sliding seal in the valve bore 71, so that the radial bores 78 are separated in fluid terms from the spring space 75, and the annular groove 80 is separated in fluid terms from the space in front of the end side 79 of the valve housing. Therefore, there is no fluid communication between the inlet 46 and the outlet 47 of the valve. In operation, the piston slide 48 is acted on by the inlet pressure from the end side 79 of the valve housing 70. This inlet pressure is counteracted by the compression spring 49 and, on a surface which is the same size as that exposed to the inlet pressure, the outlet pressure which is present at the outlet 47. Equilibrium prevails at the piston slide 48 if the outlet pressure is lower than the inlet pressure by a pressure difference which is equivalent to the force of the compression spring 49. Through rotation of the adjustment screw 72, it is possible to change the prestress of the compression spring 49 and therefore the pressure difference between the inlet pressure and the outlet pressure.

We claim:

1. A control arrangement for supplying pressure medium to at least two hydraulic consumers (14, 15, 16) comprising a variable-displacement pump (10) which is controlled according to required flow and a setting of which is variable as a function of highest load pressure of actuated said hydraulic consumers (14, 15, 16), by a pump controller (11), two displaceable meter-in variable restrictors (17, 18, 19); a first of which is arranged between a feed line (13), which leads from the variable-displacement pump (10), and a first hydraulic consumer (14, 15, 16), and a second of which is arranged between the feed line (13) and a second hydraulic consumer (14, 15, 16), and two pressure compensators (23, 24, 25), a first of which is connected downstream of the first meter-in variable restrictor (17, 18, 19), and a second of which is connected downstream of the second meter-in variable restrictor (17, 18, 19), and a control piston of which is actable on in an opening direction, on a front side, by pressure downstream of the associated meter-in variable restrictor (17, 18, 19), and wherein the control pistons of the pressure compensators (23, 24, 25) are actable on in a closing direction by a control pressure which is present in a rear control space (26), is derived from feed pressure prevailing in the feed line (13) with a valve device (45, 52) and changes with the feed pressure.

2. The control arrangement as claimed in claim 1, wherein a difference between the feed pressure and the control pressure, when the variable-displacement pump (10) has not yet been displaced as far as its stop, is no greater than between the feed pressure and the highest load pressure.

3. A control arrangement for supplying pressure medium to at least two hydraulic consumers (14, 15, 16) comprising a variable-displacement pump (10) which is controlled according to required flow and a setting of which is variable as a function of highest load pressure of actuated said hydraulic consumers (14, 15, 16), by a pump controller (11), two displaceable meter-in variable restrictors (17, 18, 19), a first of which is arranged between a feed line (13), which leads from the variable-displacement pump (10), and a first hydraulic consumer (14, 15, 16), and a second of which is arranged between the feed line (13) and a second hydraulic consumer (14, 15, 16), and two pressure compensators (23, 24, 25) a first of which is connected downstream of the first meter-in variable restrictor (17, 18, 19) and a second of which is connected downstream of the second meter-in variable restrictor (17, 18, 19), and a control piston of which is actable on in an opening direction, on a front side, by pressure downstream of the associated meter-in variable restrictor (17, 18, 19), and wherein the control pistons of the pressure compensators (23, 24, 25) are actable on in a closing direction by a control pressure which is present in a rear control space (26), is derived from feed pressure prevailing in the feed line (13) with a valve device (45, 52) and changes with the feed pressure,wherein the valve device is a pressure differential valve (45, 52), an inlet (46) of which is connected to a feed line (13) and an outlet (47) of which is connected to r the rear control space (28) of the a pressure compensator (23, 24, 25).

4. The control arrangement as claimed in claim 3, wherein the pressure differential valve (45, 52) is set to a fixed pressure difference and has a movable valve member (48) which is acted on by the feed pressure for opening fluid communication between the feed line (13) and the control space (26) at the pressure compensator (23, 24, 25) and is acted on by the control pressure and by a spring (49) for closing said communication.

5. A control arrangement for supplying pressure medium to at least two hydraulic consumers (14, 15, 16) comprising a variable-displacement pump (10) which is controlled according to required flow and a setting of which is variable as a function of highest load pressure of actuated said hydraulic consumers (14, 15, 16), by a pump controller (11), two displaceable meter-in variable restrictors (17, 18, 19), a first of which is arranged between a feed line (13), which leads from the variable-displacement pump (10), and a first hydraulic consumer (14, 15, 16), and a second of which is arranged between the feed line (13) and a second hydraulic consumer (14, 15. 16), and two pressure compensators (23, 24, 25), a first of which is connected downstream of the first meter-in variable restrictor (17, 18, 19), and a second of which is connected downstream of the second meter-in variable restrictor (17, 18, 19), and a control piston of which is actable on in an opening direction, on a front side, by pressure downstream of the associated meter-in variable restrictor (17, 18, 19), and wherein the control pistons of the pressure compensators (23, 24, 25) are actable on in a closing direction by a control pressure which is present in a rear control space (26), is derived from feed pressure prevailing in the feed line (13) with a valve device (45, 52) and changes with the feed pressure, wherein the rear control spaces (26) of the plurality of pressure compensators (23, 24) are directly connected to one another, so that a same control pressure prevails in the rear control spaces (26) of said pressure compensators (23, 24).

6. A control arrangement for supplying pressure medium to at least two hydraulic consumers (14, 15, 16) comprising a variable-displacement pump (10) which is controlled according to required flow and a setting of which is variable as a function of highest load pressure of actuated said hydraulic consumers (14, 15, 16), by a pump controller (11), two displaceable meter-in variable restrictors (17, 18, 19), a first of which is arranged between a feed line (13), which leads from the variable-displacement pump (10), and a first hydraulic consumer (14, 15, 16), and a second of which is arranged between the feed line (13) and a second hydraulic consumer (14, 15, 16), and two pressure compensators (23, 24, 25), a first of which is connected downstream of the first meter-in variable restrictor (17, 18, 19), and a second of which is connected downstream of the second meter-in variable restrictor (17, 18, 19), and a control piston of which is actable on in an opening direction, on a front side, by pressure downstream of the associated meter-in variable restrictor (17, 18, 19), and wherein the control pistons of the pressure compensators (23, 24, 25) are actable on in a closing direction by a control pressure which is present in a rear control space (26), is derived from feed pressure prevailing in the feed line (13) with a valve device (45, 52) and changes with the feed pressure, further comprising a load signaling line (37), to which the highest load pressure of the hydraulic consumers (14, 15, 16) actuated in each case is input via selection valves (36), and by a valve (51) which opens up fluid communication from the load signaling line (37) to the rear control space (26) of at least one pressure compensator (23, 24) when a difference between the feed pressure and the highest load pressure falls below a defined level.

7. The control arrangement as claimed in claim 6, wherein said valve between the load signaling line (37) and the rear control space (26) is a nonreturn valve (51) which opens toward said control space (26).

8. A control arrangement for supplying pressure medium to at least two hydraulic consumers (14, 15, 16) comprising a variable-displacement pump (10) which is controlled according to required flow and a setting of which is variable as a function of highest load pressure of actuated said hydraulic consumers (14, 15, 16), by a pump controller (11).

two displaceable meter-in variable restrictors (17, 18, 19), a first of which is arranged between a feed line (13), which leads from the variable-displacement pump (10), and a first hydraulic consumer (14, 15, 16), and a second of which is arranged between the feed line (13) and a second hydraulic consumer (14, 15, 16), and two pressure compensators (23, 24, 25), a first of which is connected downstream of the first meter-in variable restrictor (17, 18, 19), and a second of which is connected downstream of the second meter-in-variable restrictor (17, 18, 19), and a control piston of which is actable on in an opening direction, on a front side, by pressure downstream of the associated meter-in variable restrictor (17, 18, 19), and wherein the control pistons of the pressure compensators (23, 24, 25) are actable on in a closing direction by a control pressure which is present in a rear control space (26), is derived from feed pressure prevailing in the feed line (13) with a valve device (45, 52) and changes with the feed pressure.

a the control pressure for the rear control space (26) of the first pressure compensator (23, 24) is derived from the pump pressure by a first said valve device (45), and the control pressure for the rear control space (26) of another pressure compensator (25) is derived from the pump pressure by a second said valve device (52), and a priority valve (55), by which, in order to maintain a desired pressure difference across the meter-in variable restrictor (19) arranged upstream of said another pressure compensator (25), and therefore a sufficient a supply of pressure medium to a corresponding prioritized hydraulic consumer (16), in event of delivery quantity of the variable-displacement pump (10) not meeting demand (undersaturation), the control pressure in the rear control space (26) of the first pressure compensator (23, 24) is raisable to above the control pressure in case of saturation.

9. The control arrangement as claimed in claim 8, wherein the priority valve (55) comprises a first port (56), which is connected to the feed line (13), and a second port (57), which is connected to the rear control space (26) of the first pressure compensator (23, 24), and a valve member which, in direction of opening the connection between the first port (56) and the second port (56), is actable on by pressure prevailing in a line section downstream of the meter-in variable restrictor (19) assigned to the prioritized hydraulic consumer (16) and by an additional force, and, in direction of closing the connection between the first port (56) and the second port (57), is actable on by the feed pressure.

10. A control arrangement for supplying pressure medium to at least two hydraulic consumers (14, 15, 16) comprising a variable-displacement pump (10) which is controlled according to required flow and a setting of which is variable as a function of highest load pressure of actuated said hydraulic consumers (14, 15, 16), by a pump controller (11), two displaceable meter-in variable restrictors (17, 18, 19), a first of which is arranged between a feed line (13), which leads from the variable-displacement pump (10), and a first hydraulic consumer (14, 15, 16), and a second of which is arranged between the feed line (13) and a second hydraulic consumer (14, 15, 16), and two pressure compensators (23, 24, 25), a first of which is connected downstream of the first meter-in variable restrictor (17, 18, 19), and a second of which is connected downstream of the second meter-in variable restrictor (17, 18, 19), and a control piston of which is actable on in an opening direction, on a front side, by pressure downstream of the associated meter-in variable restrictor (17, 18, 19), and wherein the control pistons of the pressure compensators (23, 24, 25) are actable on in a closing direction by a control pressure which is present in a rear control space (26), is derived from feed pressure prevailing in the feed line (13) with a valve device (45, 52) and changes with the feed pressure, further comprising:

a) a valve housing (70) having a valve bore (71), into which an inlet channel (46) and, at an axial distance therefrom, an outlet channel (47) open radially; <b) a piston slide (48), for controlling an opening cross section at the inlet channel (46) and which on a first end side is acted on by pressure prevailing in the inlet channel (46) and on its second end side is acted on by pressure prevailing in the outlet channel (47), is axially displaceable in the valve bore (71);

c) a compression spring (49), which acts on the piston slide (48) so as to reduce the opening cross section, is accommodated in a spring space (75) situated between one end side of the piston slide (48) and a closure (72) of the valve bore (71);

d) the outlet channel (47) opens freely into the spring space (75); and wherein e) the piston slide (48) is a hollow piston with bores (78), via which an annular space (80), which is formed between the piston slide (48) and the valve housing (70) and which has an encircling control edge for controlling the opening cross section at the inlet channel (46), is in fluid communication with the spring space (75), and having two sealing sections, which are in each case guided in a sealed manner in the valve bore (71) and of which one sealing section provides a seal between the inlet channel (46) and the spring space (75) and the other sealing section provides a seal between the fluid path (80, 82, 81, 83) passing through the piston slide (48) and the first end side of the piston slide (48).

11. The pressure differential valve as claimed in claim 10, wherein the compression spring (49) is supported against a closure bolt (72) which is screwed into the valve bore (71) and closes off the valve bore (71).

12. The pressure differential valve as claimed in claim 10, wherein the valve bore (71) has a larger diameter in a region of the spring space (75) than in a region on both sides of the inlet channel (46).

13. The pressure differential valve as claimed in claim 12, wherein the valve housing (70) is an insertion cartridge with said valve bore (71) which is open on the first end side of the piston slide (48), and the piston slide (48) is formed as a stepped piston, of which an inner shoulder belonging to its section of larger diameter, in the valve bore (71), is actable on toward the open side of the valve bore (71).

* * * * *